March 16, 1937.  J. D. GAY, JR  2,073,987
TRACTOR ATTACHMENT FOR HARVESTERS
Filed July 18, 1936  2 Sheets-Sheet 1
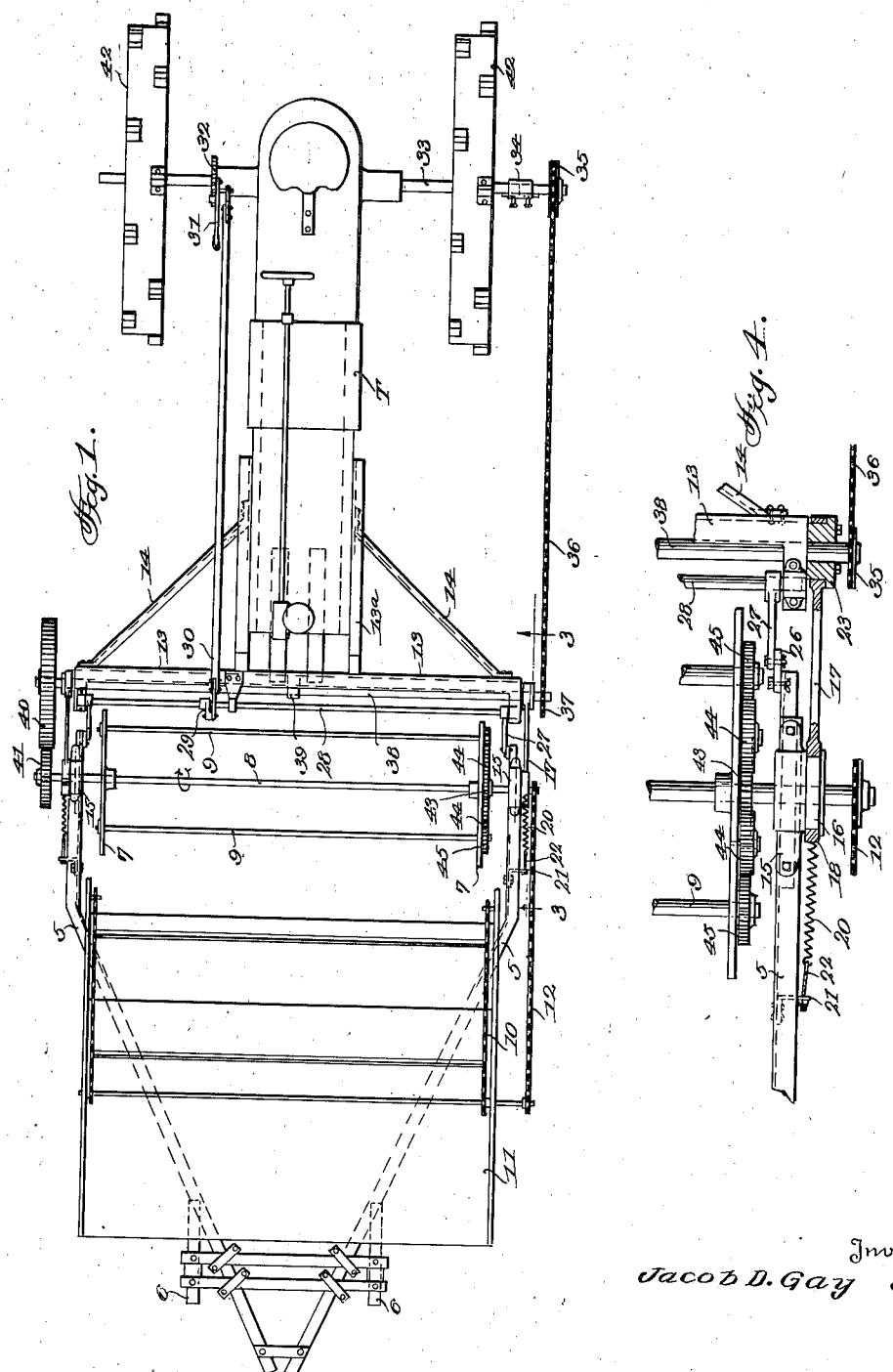
Inventor
Jacob D. Gay Jr.
By Munn Anderson & Liddy
Attorney

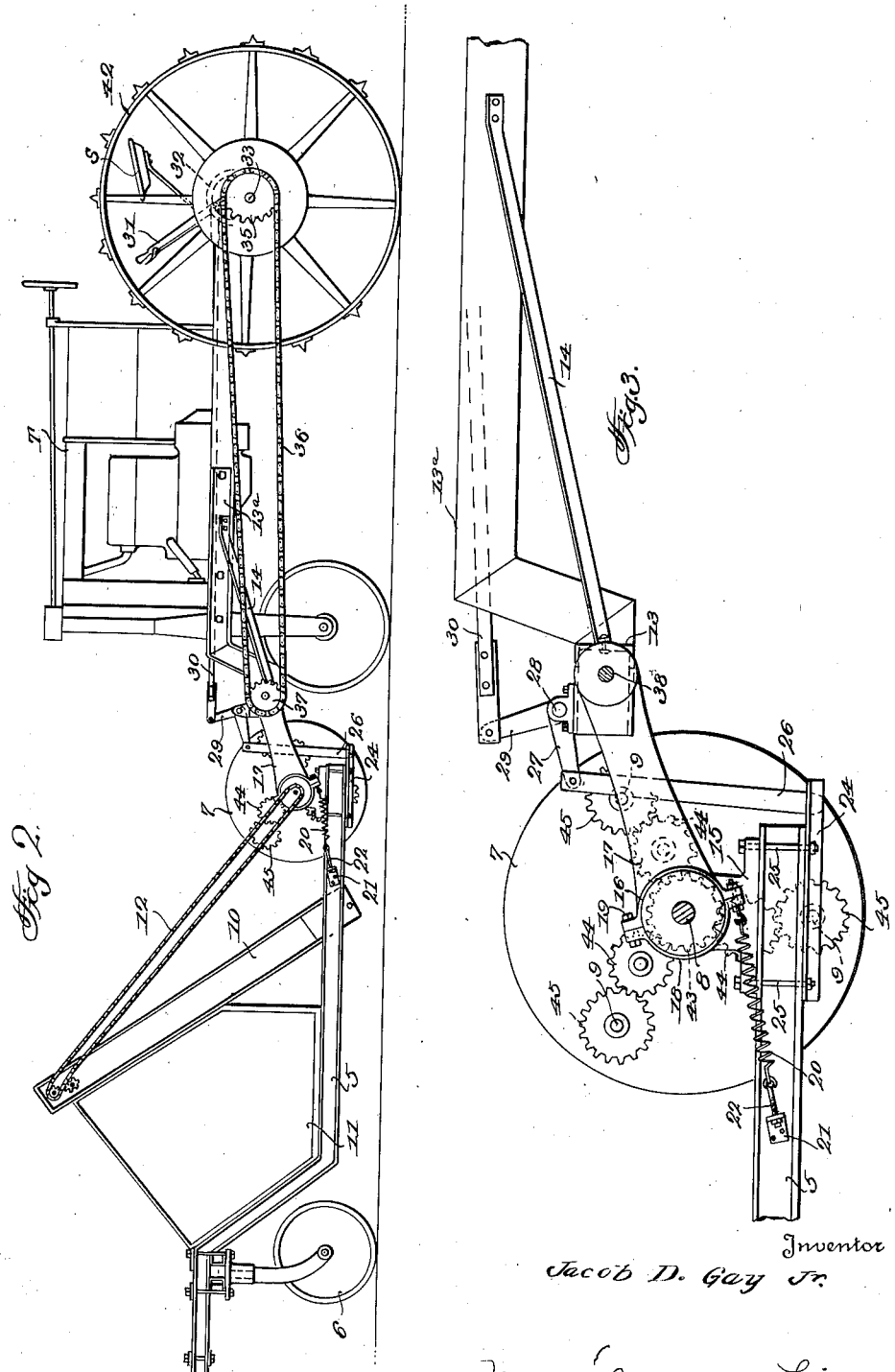

Patented Mar. 16, 1937

2,073,987

UNITED STATES PATENT OFFICE 2,073,987

TRACTOR ATTACHMENT FOR HARVESTERS

Jacob D. Gay, Jr., Pine Grove, Ky.

Application July 18, 1936, Serial No. 91,384

3 Claims. (Cl. 56—19)

My invention relates to improvements in tractor attachments for seed harvesters and it consists in the constructions, combinations, and arrangements of parts hereinafter described and claimed.

In grass seed harvesters particularly of the type set forth in patent to McCormick, No. 1,063,812 of June 3, 1913, some of the seed is lost because whether these harvesters are being drawn by animals or by tractors a considerable portion of the grass is trodden down or bent so as to escape the strippers carried by the harvester.

An object of my invention is to provide a tractor attachment for use on blue grass seed harvesters of the type shown in the aforesaid patent which will push the harvester ahead of it so that the stripper heads carried by the harvester will engage the upstanding grass instead of that which has been bent or trodden down.

A further object of the invention is to provide a tractor attachment having means for raising and lowering the harvester mechanism itself from the seat of the tractor.

A further object is to provide a hitch or attachment which can be connected up without the use of welding or other special tools.

Other objects and advantages will appear in the following specification, and the novel features of the invention will be particularly pointed out in the appended claims.

My invention is illustrated in the accompanying drawings forming part of this application, in which:—

Figure 1 is a plan view of the tractor showing its connection with the harvester, Figure 2 is a side elevation of the device shown in Figure 1, Figure 3 is an enlarged sectional view on the line 3—3 of Figure 1, and Figure 4 is an enlarged detail plan view of a portion of the mechanism shown in Figure 1.

This invention as stated is an attachment for harvesters of the type shown in the McCormick patent No. 1,063,812 and not in the harvester itself so I will describe only enough of the harvester to show the relationship of the harvester with the tractor attachment.

Referring now particularly to Figs. 1 and 2 I have shown therein a harvester including a frame 5 supported at its forward end upon a pivoted caster wheel 6. At the rear end of the harvester is a drum 7 which is mounted to rotate with a shaft 8. The drum 7 has transverse shafts 9 which bear rotating frames (not shown) that carry the stripping combs. An inclined conveyor 10 is provided for carrying away the seed stripped from the grass by combs and for dumping it into the hopper or receiver 11, all as set forth in the prior patent aforesaid. A conveyor drive is shown at 12.

The present invention involves a tractor mechanism shown in general at T. Secured to the front end of the tractor at the sides thereof is a frame 13 having rearwardly extending portions 13a which are bolted to the tractor as shown in the drawings. This frame is preferably provided with diagonal brace members 14 of angle steel to absorb the strain and twist in turning. Secured to the frame members 5 of the harvester near the rear ends thereof is a bracket 15, the central portion of which constitutes a bearing housing for the shaft. This bearing housing has a lateral extension 16 having a groove arranged to receive the semi-circular end of a radius arm 17, this arm being clamped to pivot on the member 16 by means of an arc-shaped portion 18 which is secured to the arm 17 by bolts 19. The underside of the arm 17 is connected by means of a spring 20 with a bracket 21 secured to the frame 5 through the medium of a tension adjusting bolt 22.

The opposite end of the arm 17 is pivotally mounted on a bearing 23 secured to the end of the frame 13 by means of bolts or in any other suitable manner. It will be understood that the radius arm 17 is duplicated on the opposite side of the machine as shown in the drawings.

The elevation of the drum which bears the stripping combs (not shown) is effected through the following means. Underneath each of the frame members 5 on either side is secured a bar 24. A convenient means for securing this bar and also the bracket 15 is the bolts 25 shown in Figure 2. The bar 24 is pivotally connected with a link 26 which is in turn connected with an arm 27 rigidly secured to a shaft 28. The latter has an upstanding arm 29 keyed to the shaft 28. A rod 30 is pivotally secured to the arm 29 and leads to a lever 31 having a locking segment 32 which is pivoted on any suitable support in reach of the occupant of the seat S of the tractor.

As shown in the drawings the main drive shaft 33 is prolonged preferably by a coupling 34 and bears a sprocket 35 which is connected by a sprocket chain 36 to a sprocket 37 on the end of a shaft 38. The latter is mounted in bearings at each end thereof and also in a bearing 39 near the central portion of the shaft. On the opposite end of the shaft from the sprocket 37 is a gear 40 in constant mesh with a gear 41 on the end of the shaft 8.

From the foregoing description of the various parts of the device the operation thereof may be readily understood. In connecting the tractor with the McCormick blue grass seed harvester it is necessary to remove the drive wheels shown in the patent and to make certain other changes as indicated in the drawings. In the present invention the front wheels of the patent are released by the caster wheel 6.

The construction described provides for the pushing of the harvester ahead of the tractor so that the harvester is passing through grass which has not been beaten or trodden down. The rotation of the traction wheels 42 transmits a rotary movement of the shaft 8 through 33, 34, 35, 36, 37, 38, 40 and 41 so that the drum 7 revolves. The shaft 8 bears a gear 43 which through the medium of idlers 44 drives the gears 45 that turn the shafts 9 which bear the frames with their stripper combs (not shown) but described in the McCormick patent aforesaid.

When it is desired to raise the harvester the lever 31 is grasped and pulled rearwardly and through the medium of the parts 30, 29, 27, 26 and 24 the rear portion of the harvester is raised, the end of the radius arm 17 pivoting during this movement. To lower the device the lever 31 is shifted in the opposite direction and it may be locked in shifted position by the locking segment 32.

The purpose of the springs 20 is to afford a counterbalance for the weight of the harvester for it is obvious that if the rear end of the harvester is lowered there must be a pivotal action at both ends of the radius arms 17 as shown and this pivotal action may be resisted by the spring 20 to such an extent that it will nearly balance the weight so that very little effort is required to raise the rear end of the harvester by means of the lever.

Since the harvester is rigidly carried by the tractor as far as the horizontal movement is concerned although it is pivotally carried as far as a vertical movement is concerned as explained, the turning of the harvester is accomplished by means of the ordinary steering apparatus, that is to say, the tractor will turn on its own wheels and the front end of the harvester will swing in accordance therewith, being supported by the caster wheel 6 which will of course pivot to move in the direction in which the turning force is applied.

It will be observed that with the connection made as indicated above the raising and lowering of the rear end of the harvester will not interfere with the driving of the harvester mechanism since the radius arms 17 maintain the shaft 8 at a constant distance from the shaft 38 upon which the gear 40 is mounted which meshes with the gear 41 on the shaft 8. In other words the gear 41 merely travels around the gear 40 for the arc in which the rear end is raised.

I claim:

1. The combination with a seed harvester having a rotatable drum shaft, a drum carried thereby, said drum being adapted to be provided with the usual seed stripping devices, of a tractor disposed in the rear of said harvester, means for connecting said tractor with said harvester for imparting a forward movement of the harvester, a drive shaft for imparting a rotary movement to said drum shaft, means for raising and lowering the rear end of the harvester comprising a pair of spaced apart radius arms, one end of said arms being pivoted on the axis of said drum shaft, the opposite end of the arms being pivoted on the axis of said drive shaft, and gearing between said drive shaft and said drum shaft.

2. The combination with a seed harvester having a rotatable drum shaft, a drum carried thereby, said drum being adapted to be provided with the usual seed stripping devices, of a tractor disposed in the rear of said harvester, means for connecting said tractor with said harvester for imparting a forward movement to the harvester, means for imparting a rotary movement to said drum shaft, and means for raising or lowering the rear end of the harvester while maintaining the driving connection with the drum, said last-named means including an operating lever pivotally disposed near the seat of the tractor, and link and lever connections between said operating lever and the rear end of the harvester.

3. The combination with a seed harvester having a rotatable drum shaft, a drum carried thereby, said drum being adapted to be provided with the usual seed stripping devices, of a tractor disposed in the rear of said harvester, means for connecting said tractor with said harvester for imparting a forward movement of the harvester, a drive shaft for imparting a rotary movement to said drum shaft, means for raising and lowering the rear end of the harvester comprising a pair of spaced apart radius arms, one end of said arms being pivoted on the axis of said drum shaft, the opposite end of the arms being pivoted on the axis of said drive shaft, gearing between said drive shaft and said drum shaft, and spring counterbalancing means connected at one end to said radius arms, and at the other end to the frame of the harvester.

JACOB D. GAY, Jr.